No. 855,877. PATENTED JUNE 4, 1907.
E. S. BRYANT & H. J. BERY.
COMMUTATOR GRINDER.
APPLICATION FILED APR. 7, 1906.

3 SHEETS—SHEET 1.

Witnesses:

Inventors
E. S. Bryant & H. J. Bery
By their Attorney
Edward N. Pagelsen.

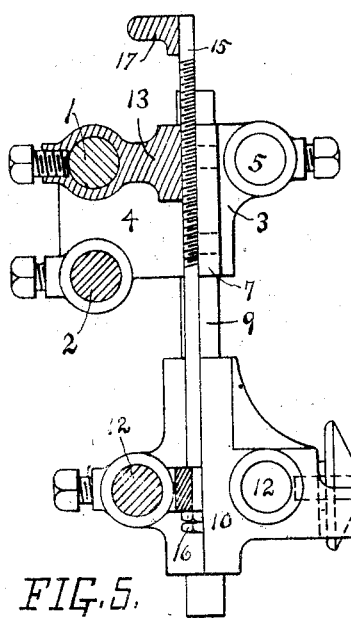
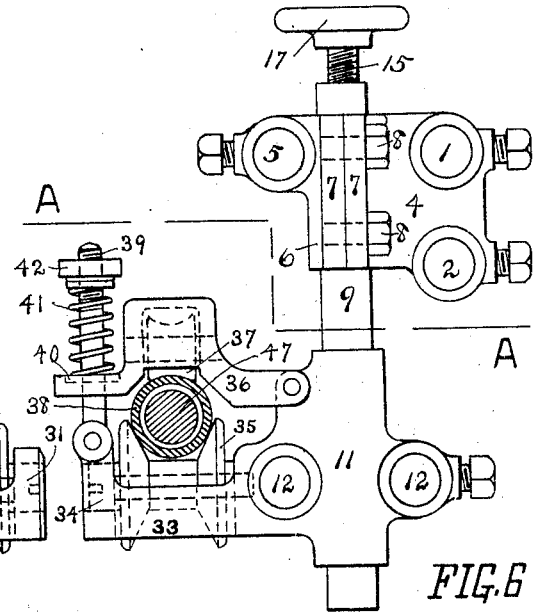
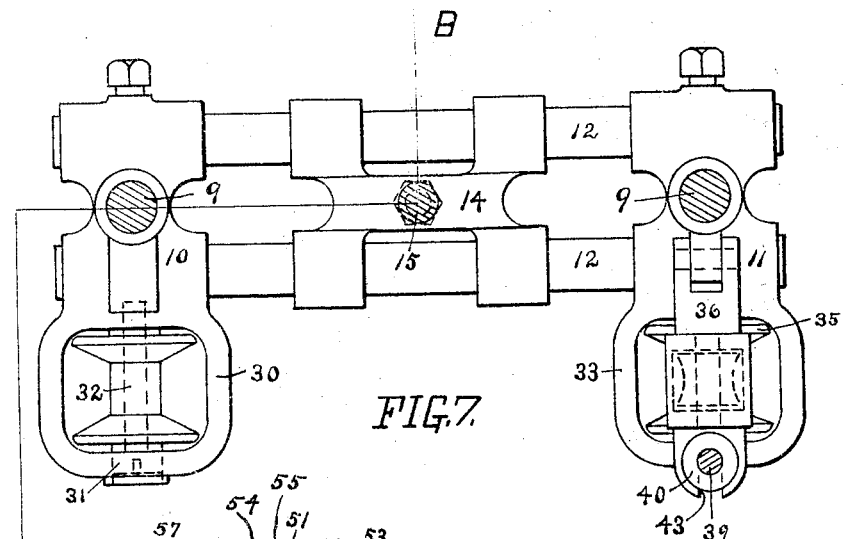
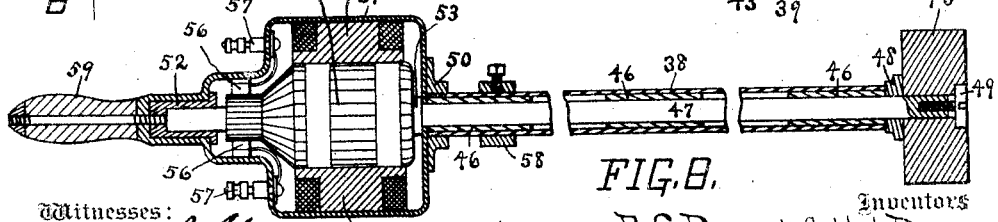

No. 855,877. PATENTED JUNE 4, 1907.
E. S. BRYANT & H. J. BERY.
COMMUTATOR GRINDER.
APPLICATION FILED APR. 7, 1906.
3 SHEETS—SHEET 3.
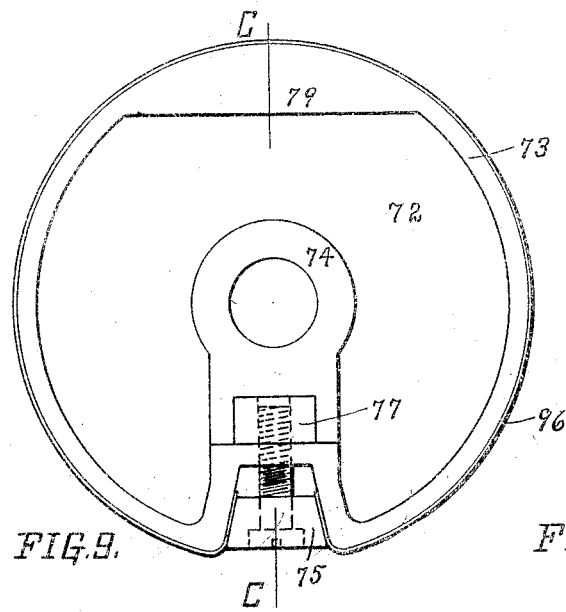
FIG. 9.
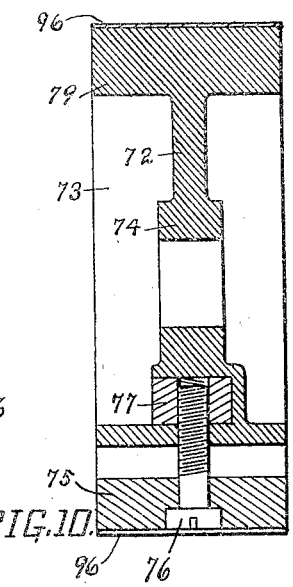
FIG. 10.
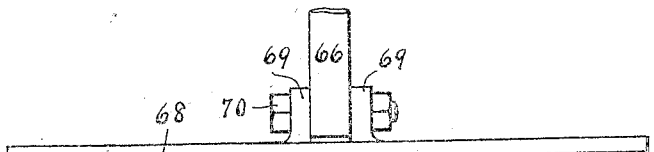
FIG. 11.
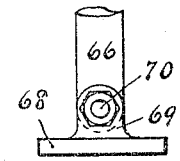
FIG. 12.
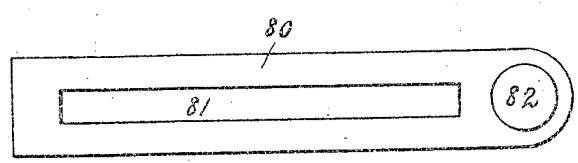
FIG. 13.
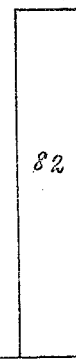
FIG. 14.
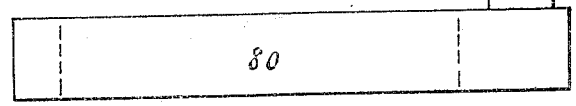
Witnesses:
Inventors
E. S. Bryant & H. J. Bery.
By their Attorney
Edward N. Pagelsen.

UNITED STATES PATENT OFFICE.

ELLSWORTH S. BRYANT AND HENRY J. BERY, OF DETROIT, MICHIGAN.

COMMUTATOR-GRINDER.

No. 855,877.  Specification of Letters Patent.  Patented June 4, 1907.

Application filed April 7, 1906. Serial No. 310,400.

*To all whom it may concern:*

Be it known that we, ELLSWORTH S. BRYANT and HENRY J. BERY, citizens of the United States, residing at Detroit, in the county of Wayne and State of Michigan, have invented a new and Improved Commutator-Grinder, of which the following is a specification.

Our improvements relate to mechanism for grinding commutators of electric generators and motors that have become worn, without dismantling the machine, and the objects of our improvements are,—to provide a device of this character which may be readily attached to dynamos and motors of different sizes and types; to provide grinding mechanism that is accurately adjustable with reference to the commutator; and to provide a device of this character that can be easily and quickly attached and detached from the electric machine.

Our invention consists in a slidable hollow shaft or sleeve within which an emery wheel arbor is revolubly mounted.

It also consists in adjustable mechanism adapted to be mounted on one of the brush holders of a generator or motor, which mechanism is provided with bearings for the arbor carrying sleeve.

It consists further in the specific details illustrated in the accompanying drawings and particularly described in the specification.

Figure 1:
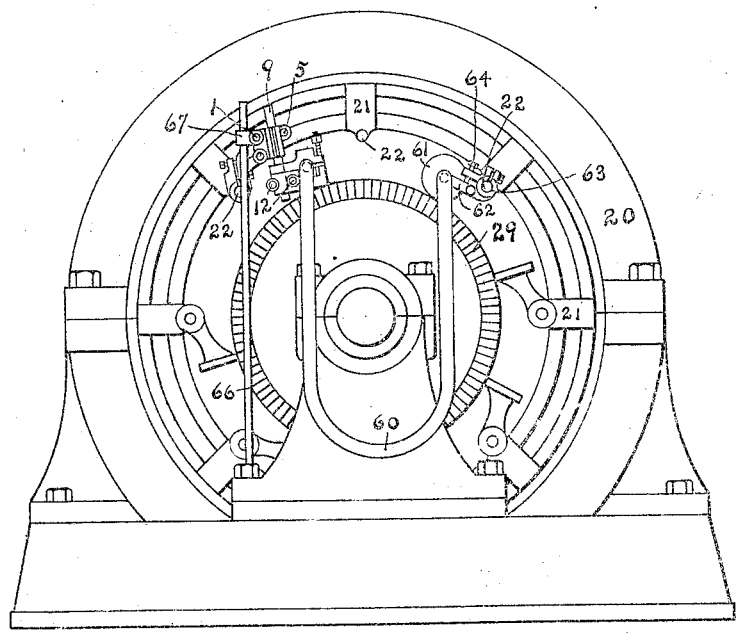
Figure 2:
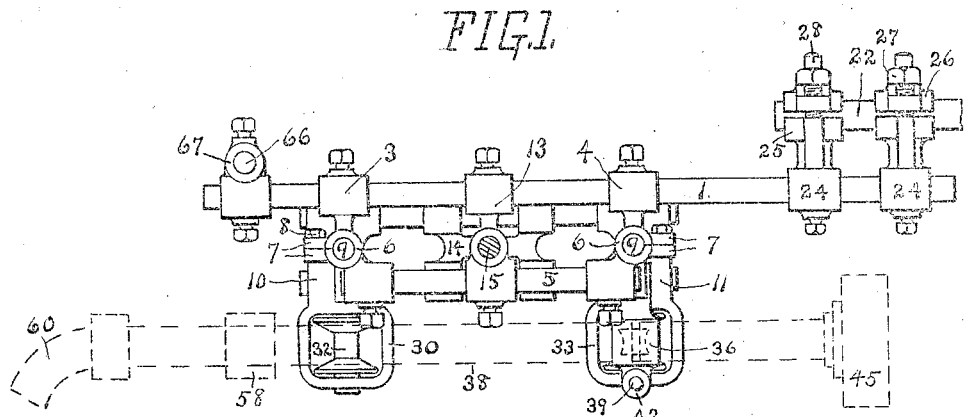
Figure 3:
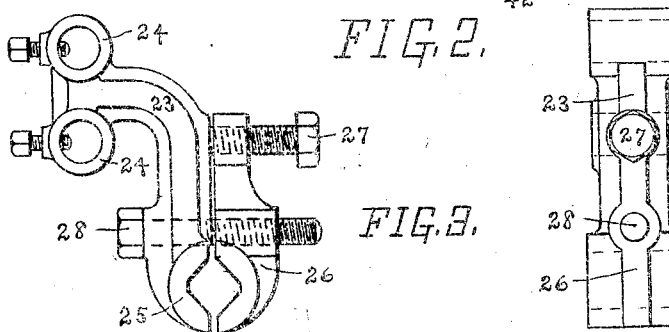

In the accompanying drawings, Figure 1 is a view of a dynamo having brushes removed from several of the brush holders and our improved commutator grinder attached to said machine. Fig. 2 is a plan of our improved grinding mechanism, the emery wheel arbor carrying sleeve and connections being indicated in dotted lines. Figs. 3' and 4 are views of the clamp for securing the apparatus to a brush holder of an electric machine. Fig. 5 is a view, partly in section on the line B—B of Fig. 7, of frame of the apparatus. Fig. 6 is a view of the frame from the opposite end. Fig. 7 is a plan of the frame on the line A—A of Fig. 6. Fig. 8 is a longitudinal section of the emery wheel arbor, sleeve and motor. Fig. 9 is a side view of one form of polishing wheel. Fig. 10 is a cross section on the line C—C of Fig. 9. Figs. 11 and 12 are details of the foot of a brace or prop. Figs. 13 and 14 are details of a substitute support to be used where suitable brush holders, whereto the grinder frame may be attached, are wanting.

Similar reference characters refer to like parts throughout the several views.

To obviate the necessity of dismantling electric generators and motors when the commutators become worn, the apparatus illustrated in the accompanying drawings has been designed for grinding the commutators perfectly cylindrical while the machine is in motion. As shown, this apparatus is especially adapted to clamp onto the brush holders of dynamos and motors.

In the drawings, 1 and 2 are parallel rods that are secured in frames 3 and 4, which frames carry a third parallel rod 5. The frames 3 and 4 are formed with sockets 6 having lugs or flanges 7 provided with screws 8 to securely hold the rods 9 at right angles to the plane passing through rods 1 and 5. Slidable on these rods 9 are the frames 10 and 11, which are connected across by the rods 12. These frames 10 and 11 support the bearings for the arbor sleeve. The rods 1 and 5 are connected midway between the frames 3 and 4 by a bracket 13, and the rods 12 are again connected by the bracket 14, midway between the frames 10 and 11.

A screw 15 is threaded in the bracket 13 and its reduced end is revoluble in the bracket 14, the nuts 16 at its lower end preventing longitudinal movement with reference to this bracket 14. The screw may be turned by means of the hand wheel 17. (Omitted in Fig. 2.) When the apparatus is secured to an electric machine, the rods 1, 2, 5 and 9, the frames 3 and 4, and the bracket 13 will be stationary, while the frames 10 and 11, the rods 12 and the bracket 14 may be moved toward and from the stationary parts by means of the screw 15, the frames 10 and 11 sliding on the rods 9.

The dynamo shown in Fig. 1 is provided with the usual series of brush holders 21, the brushes being shown removed from three of them. The apparatus is shown secured to one of the brush holder posts 22 by means of clamps (Figs. 2, 3 and 4) which consist of a body portion 23 having sleeves 24 to fit on the rods 1 and 2. The opposite end 25 of the body portion together with a jaw 26 forms an adjustable clamp to engage the brush holder post 22. The screws 27 and 28 permit adjustment within a considerable range. When possible, a pair of these clamps are employed. As the clamps may be secured at any angle on the posts 22, the whole apparatus can be readily positioned with reference to the commutator 29.

The emery wheel used with this apparatus should be readily slidable longitudinally along the face of the commutator and should be yieldably held toward the same. The frame 10 is provided with a bracket 30 and has a screw 31 secured therein on which is mounted the roller 32. The head of the screw is journaled in the bracket and engages the end of the hub of the roller and thus prevents endwise movement of the same. The frame 11 has a similar bracket 33 carrying the screw 34 and roller 35. Pivoted to the frame 11 is an arm 36 which carries a roller 37 adapted to bear on the upper side of the sleeve 38 that supports the emery wheel arbor 47. A screw 39 is hinged to the bracket 33 and carries a washer 40 that fits in a socket in the end of the arm 36. A spring 41 and nut 42 determine the pressure on the end of the arm 36. By lifting the washer 40 out of its socket, the screw 39 is freed to be swung out of the slot 43 in the arm 36 so as to release the same, permitting it to be swung up and the sleeve 38 to be removed.

The grinding mechanism, proper, may be of any desired construction, and the emery wheel 45 may be driven by electricity, flexible shafting or other means. In Fig. 8, the sleeve 38 is shown provided with three bearings 46 in which is revoluble the arbor 47. At the outer end of this arbor is a collar 48, and a screw 49 between which the emery wheel is secured. The sleeve 38 screws into a flange 50 to which is secured the motor case 51. At the opposite end of the case is a thimble 52 which furnishes a bearing for that end of the arbor. A collar 53 on the arbor bears against the case, and together with the thimble 52, prevents endwise movement of the arbor. The armature 54 is secured to the arbor, field magnets 55 and brushes 56 are carried by the case. Binding screws 57 are adapted to connect to the wires which carry the necessary current. A collar 58 may be positioned at any point on the sleeve 38 and by contacting with the bracket 30 prevent the emery wheel being moved in too far. A handle 59 is used by the operator for manipulating the apparatus.

Where no electric current is obtainable, the flexible shaft 60 shown in Fig. 1 may be employed. This shaft attaches at one end to the arbor 47 in the usual manner and at the other end connects to the shaft of the friction wheel 61 carried on a hinged bracket 62. The clamp 63 is secured to a post 22 of a brush holder, and is provided with a screw 64 which holds the wheel 61 in contact with the armature.

To hold the apparatus rigid when in position, we provide a rod or post 66, at the upper end of which is an adjustable attachment 67 adapted to be secured to the rod 1. At its lower end is the adjustable foot 68 (Figs. 11 and 12) provided with lugs 69 through which and through the lower end of the post passes the bolt 70. The post may be turned and the foot placed as desired and all parts then locked in position.

In Figs. 9 and 10 we have illustrated a grinding wheel adapted to polish the commutator after being ground true. It consists of a disk 72, rim 73, hub 74 and removable wedge 75. The strip 96 of sand paper or other suitable material with a felt backing is passed around the rim and its ends are held in place by the wedge 75. The screw 76 passes through the wedge and engages the removable nut 77, normally held in the socket 78. The enlargement 79 of the rim balances the wheel.

Figure 4:
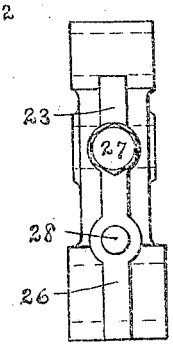

It sometimes happens that the clamp shown in Figs. 3 and 4 cannot be readily attached to the brush holders. In such cases the necessary brush holders are removed and the attachment shown in Figs. 13 and 14 substituted. This consists of a body portion 80 having a slot 81 through which the bolts that secure the brush holders in position may extend. When secured in position, the post 82 furnishes convenient means to which the clamps 23 may attach.

The operation of the apparatus is as follows: After removing the brushes from their holders where necessary, the apparatus is secured in position so that the emery wheel will be just free from the commutator. The post 66 is then placed and wires from the electric system connected to the binding posts 57 on the motor case. If the electric machine is a dynamo, the driving engine will supply power, if a motor, the machine must revolve itself. The emery wheel is then moved forward and back along the face of the commutator, being moved toward the same by means of the screw 15 until the commutator has been ground true. The emery wheel is then replaced by the polishing wheel shown in Figs. 9 and 10. The support of the inward end of the sleeve 38 being yieldable, all danger of the motor of the grinder burning out because of overload is avoided. The operator grasps the handle 59 at all times and so constantly "feels" the working of the apparatus.

Having now explained my improvements, what we claim as our invention and desire to secure by Letters Patent, is—

1. In a commutator grinder, the combination of a frame, means to rigidly secure the same to an electric machine, a second frame, means to relatively adjust the frames, a longitudinally slidable tubular sleeve, a rotary arbor carried thereby, a grinding wheel mounted on the arbor at one end of the sleeves, and an electric motor to revolve the arbor connected to the same at the other end of the sleeve.

2. In a commutator grinder, the combination of a frame, means to rigidly secure the same to the brush holders of an electric machine, a second frame, bearings carried thereby, one being yieldable, means to relatively adjust the frames, a longitudinally slidable sleeve, a rotary arbor carried thereby, a grinding wheel mounted on one end of the arbor, and an electric motor carried on one end of the sleeve to drive said arbor.

3. In a commutator grinder, the combination of a frame, means to rigidly secure the same to an electric machine, a second frame, means to relatively adjust the frames, guide rollers carried by the second frame, a longitudinally slidable sleeve carried by said rollers, a rotary arbor mounted in said sleeve, and grinding means mounted on said shaft.

4. In a commutator grinder, the combination of a plurality of rods rigidly connected parallel to each other, means for securing the same to an electric machine, a plurality of rods mounted for movement relative to the first, bearings comprising rollers carried by said rods, and grinding means mounted on said rollers.

5. In a commutator grinder, the combination of a plurality of parallel rods rigidly connected together, means for securing the same to an electric machine, guide rods mounted at right angles to the first, frames movably mounted on said guide rods, bearing rollers mounted on said frames, a sleeve longitudinally movable on said rollers, and grinding means mounted in said sleeve.

6. In a commutator grinder, the combination of parallel rods rigidly connected to an electric machine, guide rods mounted at right angles to the first, frames movably mounted on said guide rods, bearings carried by said frames, a sleeve longitudinally movable on said bearings, and an emery-wheel-arbor mounted in said sleeve.

7. In a commutator grinder, the combination of an adjustable frame, bearings carried thereby, a tubular sleeve slidable longitudinally in said bearings, an arbor journaled in said sleeve, a grinding wheel mounted at one end of the arbor at one end of the sleeve, a case connected to the other end of the sleeve, and an electric motor mounted in said case and operatively connected to said arbor.

8. In a commutator grinder, the combination of a frame, a bearing comprising a grooved roller at one end of said frame, a bearing comprising a rigid grooved roller and a spring-held roller at the other end thereof, a sleeve movable longitudinally in said bearings, and an arbor mounted in said sleeve.

9. In a commutator grinder, the combination of a frame, a clamp adapted to secure one end of the same to the brush holder of an electric machine, means to support the free end of the same, a second frame, guides secured to the first frame to support the second, a screw to provide relative adjustment of the frames, bearings provided on the second frame, a cylindrical tube longitudinally slidable in the bearings, an arbor mounted in the tube, and a grinding wheel mounted on one end of the arbor.

In testimony whereof, we have signed this specification in the presence of two subscribing witnesses.

ELLSWORTH S. BRYANT.
HENRY J. BERY.

Witnesses:
A. F. WILCOX,
EDWARD N. PAGELSEN.